United States Patent
Stillman et al.

(10) Patent No.: US 7,327,833 B2
(45) Date of Patent: Feb. 5, 2008

(54) VOICE COMMUNICATIONS MENU

(75) Inventors: Scott T. Stillman, Peachtree City, GA (US); Jennifer A. Crowe, Atlanta, GA (US)

(73) Assignee: AT&T BLS Intellectual Property, Inc., Wilmington, DE (US)

( * ) Notice: Subject to any disclaimer, the term of this patent is extended or adjusted under 35 U.S.C. 154(b) by 61 days.

(21) Appl. No.: 10/393,106

(22) Filed: Mar. 20, 2003

(65) Prior Publication Data

US 2003/0179865 A1    Sep. 25, 2003

(51) Int. Cl.
*H04M 1/64* (2006.01)

(52) U.S. Cl. .............. 379/88.18; 379/230; 455/456.2; 707/104.1

(58) Field of Classification Search ............ 379/88.18, 379/88.2, 230; 707/104.1; 455/456.2
See application file for complete search history.

(56) References Cited

U.S. PATENT DOCUMENTS

| | | | | |
|---|---|---|---|---|
| 5,802,526 | A * | 9/1998 | Fawcett et al. | 707/104.1 |
| 6,154,527 | A * | 11/2000 | Porter et al. | 379/88.18 |
| 6,421,428 | B1 * | 7/2002 | Carman et al. | 379/88.2 |
| 6,813,501 | B2 * | 11/2004 | Kinnunen et al. | 455/456.2 |
| 2002/0080949 | A1 * | 6/2002 | Mikhailov et al. | 379/230 |
| 2003/0103608 | A1 * | 6/2003 | Pearson et al. | 379/88.18 |
| 2003/0161449 | A1 * | 8/2003 | Plan | 379/88.18 |

* cited by examiner

*Primary Examiner*—Gerald Gauthier
(74) *Attorney, Agent, or Firm*—Merchant & Gould

(57) ABSTRACT

Methods and systems are described for providing a telecommunications services menu accessible via a voice interactive system, such as a voice services node. A subscriber accesses a voice communications menu by accessing a voice services node. The voice services node queries a customer profile database to obtain a list of telecommunications services available to the subscriber. At the voice services node, a voice prompt is constructed for providing the subscriber a voice menu of the available services. After the subscriber receives the voice prompt of menu items, the subscriber may select a service from the provided menu.

31 Claims, 5 Drawing Sheets

VOICE COMMUNICATIONS MENU

FIELD OF THE INVENTION

This invention relates to methods and systems for providing a telecommunications services menu accessible via a voice interactive system.

BACKGROUND OF THE INVENTION

With the advent of modem telecommunications systems, a variety of communications services are available to subscribers. For example, subscribers may receive and review voice mail messages. Subscribers may obtain directory numbers from local and third party directory assistance services. Subscribers may review electronic mail messages via Voice over Internet Protocol electronic mail reader services. Subscribers may obtain a variety of useful information via voice portal services such as traffic information, weather information, news information, financial information, and the like.

Unfortunately, most such services operate as unrelated stand-alone systems that must be accessed separately by subscribers. For example, a subscriber may access voice mail services by dialing an entry code such as "*95." After hearing her voice mail messages, the subscriber may then be required to disconnect from voice mail services and enter another entry code to utilize some other service, for example, directory assistance services for obtaining the directory number of a caller who left a message on the subscriber's voice mail system, but failed to leave a return directory number. Likewise, if the subscriber desires to access some other unrelated service such as an information service or an electronic mail reader service, the subscriber must disconnect from the prior service and dial an appropriate entry code for the desired service. Moreover, a subscriber may have difficulty remembering all services to which the subscriber has access.

It is with respect to these and other considerations that the present invention has been made.

SUMMARY OF THE INVENTION

Embodiments of the present invention solve the above and other problems by providing methods and systems for providing a telecommunications services menu accessible via a voice interactive system, such as a voice services node. Generally described, a telecommunications services subscriber accesses a voice communications menu by dialing a voice communications menu access code. The subscriber is routed to a voice services node, and the voice services node queries a customer profile database to obtain customer profile information on the subscriber. The voice services node may obtain the subscriber's customer profile based on the calling line identification number from which the subscriber is calling, or alternatively, the voice services node may prompt the subscriber for a user identification number and/or personal identification number. If the subscriber is determined to be a valid subscriber having access to the voice communications menu, the customer profile for the subscriber is returned to the voice services node from the customer profile database. At the voice services node, a voice prompt is constructed for providing the subscriber a list of menu items based on services subscribed to by the subscriber as set out in the subscriber's customer profile. Once the voice prompt is constructed, a text-to-speech conversion of the menu is prepared, and the voice prompt containing the menu is played to the subscriber.

After the subscriber receives the voice prompt of menu items, the subscriber may select a voice communications service from the provided menu items. According to one aspect of the invention, the subscriber may select to receive voice information services or email reader services from the voice services node. Alternatively, the subscriber may select to be forwarded to a voice mail system for obtaining voice mail messages previously left for the subscriber. According to another aspect of the invention, the subscriber may select an option to be forwarded to a directory assistance service to obtain directory assistance information. According to another aspect of the invention, the subscriber may select a call connection service for assisting the subscriber with call connection. According to yet another aspect of the invention, the subscriber may select an option to deliver a message to a wireless device of the subscriber or of a separate called party. Once the subscriber has made a selection, if any, from the list of available services provided to the subscriber via the menu of available services provided by the voice services node, other options may be provided to the subscriber, including administrative options for changing the subscriber's profile or adding to the list of available services available to the subscriber via the subscriber's customer profile.

These and other features, advantages and aspects of the present invention may be more clearly understood and appreciated from a review of the following detailed description of the disclosed embodiments and by reference to the appended drawings and claims.

DETAILED DESCRIPTION OF THE PREFERRED EMBODIMENT

Figure 1:
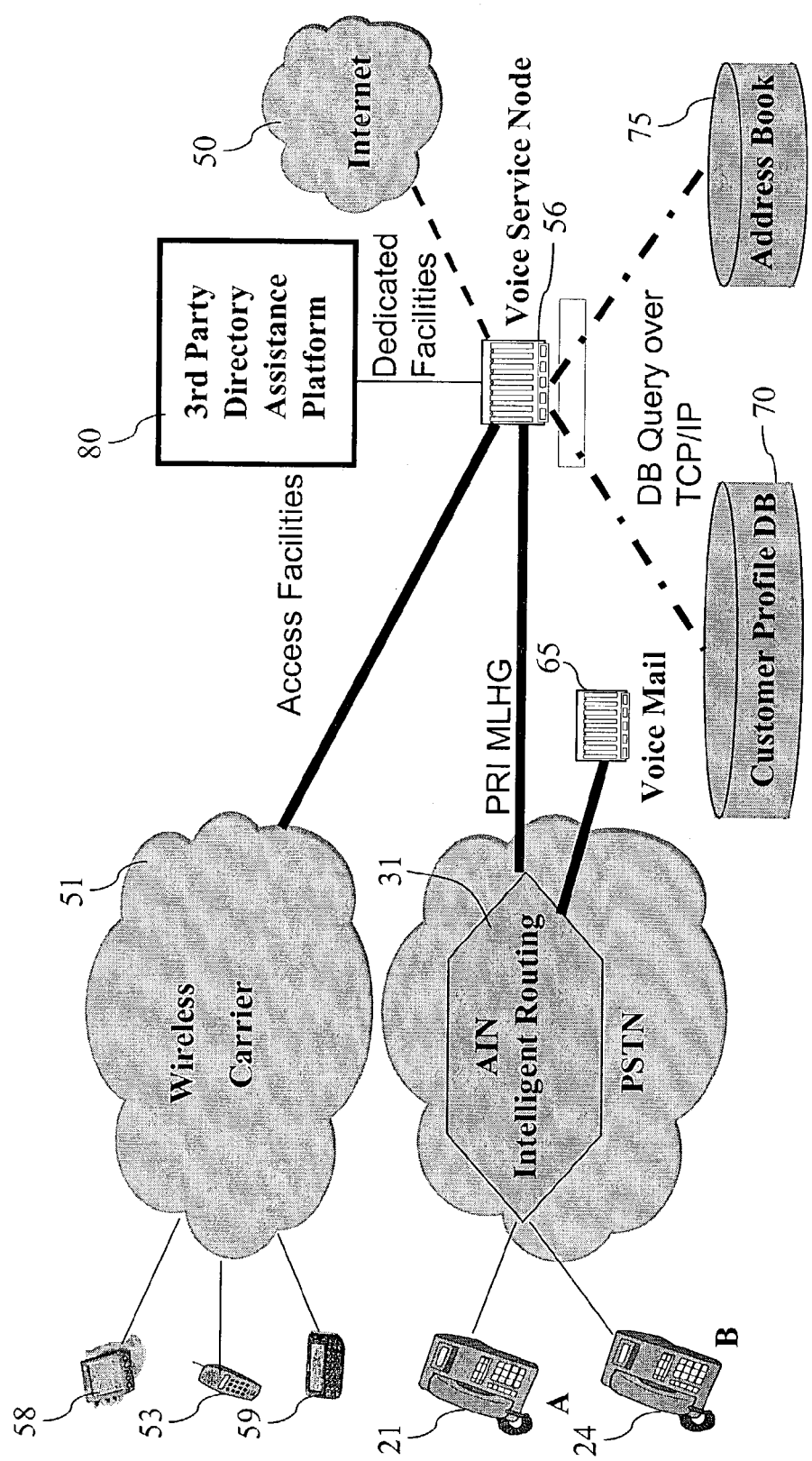
FIG. 1 is a simplified block diagram illustrating components of a wireline and wireless communications network and illustrating interaction between a voice services node and a customer profile database and subscriber address book.

As briefly described above, embodiments of the present invention provide methods and systems for providing a telecommunications services menu accessible via a voice interactive system, such as a voice services node. These embodiments may be combined, other embodiments may be utilized, and structural changes may be made without departing from the spirit and scope of the present invention. The following detailed description is, therefore, not to be taken in a limiting sense, and the scope of the present invention is defined by the pending claims and their equivalents. Referring now to the drawings, in which like numerals refer to like components or elements throughout the several figures, aspects of the present invention and an exemplary operating environment will be described.

FIG. 1 is a simplified block diagram illustrating components of a wireline and wireless communications network and illustrating interaction between a voice services node and a customer profile database and subscriber address book. According to embodiments of the present invention, a voice communications menu listing all available telecommunications services subscribed to by a given subscriber may be provided to a subscriber to allow a subscriber to access any of the available services by selecting a given service from the menu. In order to provide the voice communications services menu, a customer profile for the subscriber must be established by the subscriber at the customer profile database 70 via the voice services node 56. The subscriber may contact the voice services node 56 via a distributed computing environment such as the Internet 50 from the subscriber's computer or personal digital assistant. Alternatively, the subscriber may call the voice services node 56 from the subscriber's telephone 21, 24 through the public switched telephone network 31, or the subscriber may contact the voice services node 56 via the wireless network 51 from the subscriber's wireless telephone 53 or wireless device 58, 59. After the subscriber establishes a customer profile with the customer profile database 70 and subscribes to a number of telecommunications services, for example voice mail, electronic mail reader services, call forwarding, wireless device message delivery, and the like, access to each of those services may be provided through a single voice communications menu provided to the subscriber in accordance with embodiments of the present invention.

Subsequently, when the subscriber desires to access one of a number of services subscribed to by the subscriber through her telecommunications service provider, the subscriber may dial a voice communications menu access number, and the subscriber's call is routed to the voice services node 56. The voice services node 56 queries the customer profile database 70 to obtain the customer profile associated with the subscriber. According to an embodiment of the present invention, the voice services node 56 locates the subscriber's customer profile based on the calling line identification number associated with the line from which the subscriber is calling. Alternatively, the voice services node 56 may prompt the subscriber for a user identification number and/or a personal identification number.

Once the voice services node validates the subscriber as a valid subscriber, the customer profile for the subscriber is returned to the voice services node 56. The customer profile for the subscriber contains information associated with the subscriber including a listing of all services subscribed to by the subscriber. The voice services node 56 constructs a voice prompt for passing to the subscriber that will provide a menu of available services and that will allow the subscriber to access each of the subscriber's services. Along with the provision of a menu of available services, the voice services node 56 allows the subscriber to select from the available services. For example, according to one embodiment of the present invention, the subscriber may select to receive voice information services such as helpful information like weather, traffic and news information. The subscriber may select an electronic mail reader service for presenting the subscriber Voice over Internet Protocol presentation of electronic mail sent to the subscriber's electronic mail address. The subscriber may select to be connected to a voice mail system to review voice mail messages left to the subscriber. The subscriber may select to be forwarded to a directory assistance service to obtain directory assistance. The subscriber may select to have a message delivered to a wireless device of the subscriber or to another subscriber or called party. Or, the subscriber may select to have assistance with a variety of call completion functions.

As should be understood by those skilled in the art, the services that may be listed in the voice communications menu provided to the subscriber are limited only by the number of services subscribed to by the subscriber. Once the subscriber has reviewed all available services, the subscriber may be presented other options by the voice services node 56 including options to update the subscriber's available services.

Operating Environment

Figure 2:
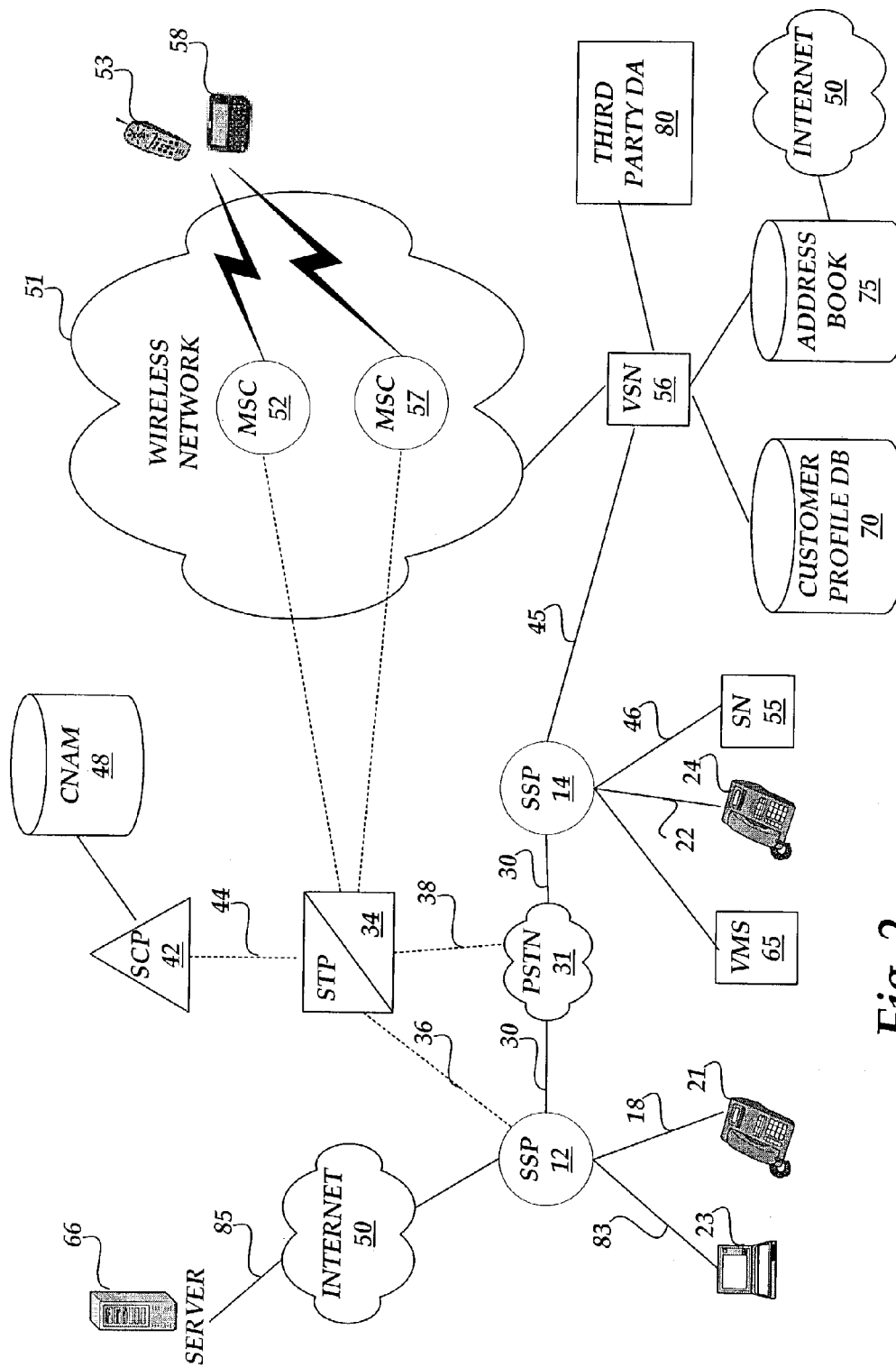
FIG. 2 is a simplified block diagram illustrating components of a wireline and wireless communications network that provides an exemplary operating environment for the present invention.

FIG. 2 is a simplified block diagram illustrating components of a wireline and wireless communications network that provides an exemplary operating environment for the present invention. FIG. 2 and the following description is intended to provide a brief, general description of a suitable operating environment in which the embodiments of the invention may be implemented. While the invention may be described in the general context of software program modules that execute in conjunction with an application program that runs on an operating system of a computer, those skilled in the art will recognize that the invention may also be implemented in a combination of other program modules. Generally, program modules include routines, programs, components, data structures and other types of structures that perform particular tasks or implement particular abstract data types. Moreover, those skilled in the art will appreciate that the invention may be practiced with other telecommunication system and computer system configurations, including hand-held devices, multi-processor systems, multi-processor based or programmable consumer electronics, mini computers, mainframe computers, and the like. The invention may also be practiced in a distributed computing environment where tasks are performed by remote processing devices that are linked through a communications network. In a distributed computing environment, program modules may be located in both local and remote memory sources devices.

The public switched telephone network 31 that evolved in the 1980s incorporated the advanced intelligent network (AIN). Some of the components of the advanced intelligent network are illustrated in FIG. 2. FIG. 2 is illustrative of at least a part of the advanced intelligent network (AIN) 100 of a typical local exchange carrier integrated with components of a wireless network 51. The advanced intelligent network (AIN) uses the signaling system 7 (SS7) network for signal or system control message transport. The components thereof are well known to those skilled in the art. The operation of many of the components of the advanced intelligent network is also described in U.S. Pat. No. 5,245,719 to Weisser entitled "Mediation of Open Advanced Intelligent Network Interface by Shared Execution Environment" which is incorporated herein by reference. The SS7 communications protocol is provided in the document entitled "Bell Communications Research Specification of Signaling System 7," Document TR-NWT-000246, Issue 2 (June 1991), plus Revision 1 (December 1991), which is also incorporated herein by reference.

A plurality of central offices is provided in a typical public switched telephone network. As shown in FIG. 2, each central office may include an electronic switch known to those skilled in the art as a service switching point (SSP). These are indicated in FIG. 2 as SSP switches 12 and 14. The number of SSP switches depends on the number of subscribers to be served by the public switched telephone network. An SSP is the AIN component of a typical electronic central office switch used by a local exchange carrier. The terms "SSP" and "switch" are used interchangeably hereinafter and are understood to refer to a telecommunications switch having AIN capability and which may be utilized for connecting voice channel circuits, including voice channel lines, such as trunk circuits 30.

As shown in FIG. 2, switches (SSP) 12 and 14 have a plurality of subscriber lines 18 and 20 connected thereto. Each of the subscriber lines 18 and 20 is connected to a terminating piece or pieces of customer premises equipment that are represented by telephones 21 and 24. A computer 23 also is illustrated as connected to the switch 12 via the subscriber line or CTI 83. The computer 23 is illustrative of a single or a plurality of computing and data storage devices. SSP switches 12 and 14 are connected by a plurality of trunk circuits 30. These are the voice path trunks that interconnect the central offices 12 and 14 and over which calls are connected when completed.

Each piece of terminating equipment in the PSTN 31 is preferably assigned a directory number. The term "directory number" is used herein in a manner consistent with its generally understood meaning of a number that is dialed or input by an originating party at an originating station to reach a terminating station associated with the directory number. A directory number, typically a ten digit number, is commonly referred to as a "telephone number" and may be assigned to a specific telephone line, such as the telephone line 18 shown in FIG. 1.

Much of the intelligence, and the basis for many of the enhanced features of the network, resides in the local service control point (SCP) 42 that is connected to signal transfer point 34 via SS7 data link 44. As is known to those skilled in the art, service control points, such as the SCP 42, are physically implemented by relatively powerful fault tolerant computers. Among the functions performed by the service control points is, maintenance of network, databases used in providing enhanced services. Service control points, such as SCP 42, normally implement high volume routing services, such as call forwarding and 800 number translation and routing. They are also used for maintenance of and providing access to high volume databases for authorization of billing, such as credit card number validations. In most local exchange carrier networks, service control points are only used for data base look up and routing services that take place prior to the logical completion of the call, i.e., the provision of a ringing signal to the called subscriber line and ring back to the calling subscriber.

Additional devices for implementing advanced network functions within the AIN are provided by regional STPs (not shown) and regional SCPs (not shown). The STP 34 is connected to the SSPs, via connections 36 and 38. Both the regional SCPs and the local SCP 42, which represent a plurality of local SCPs distributed throughout the AIN, are connected via respective data links to the service management system (not shown). 46 service management systems provide a centralized platform for remotely programming the various SCPs of the AIN so that a coordinated information processing scheme may be implemented for the AIN.

The modem Advanced Intelligent Network also includes service nodes (SN) 55. Those skilled in the art are familiar with service nodes, which are physically implemented by the same types of computers that embody the SCP 42. In addition to the computing capability and data base maintenance features, service nodes 55 use ISDN lines and may include DTMF signal recognition devices, tone generation devices, text to speech (TTS) voice synthesis devices and other voice or data resources. As shown in FIG. 1, the connection is through the SSP. For example, SN 55 is connected to SCP 42 via ISDN links 46 to SSP 14, ISDN/SS7 protocol conversion in SSP 14, and SS7 links 38 and 44. According to a preferred embodiment, the ISDN links 46 serve as a primary rate interface (PRI) over which services may be provided to subscribers using wireline services such as the wireline telephone sets 21 and 24 and subscribers using wireless services such as the wireless units 53, 58.

The voice services node (VSN) 56 performs the same functions as the service node 55, but also includes voice/speech recognition capability for receiving, processing and handling incoming calls based on speech-based information, commands and instructions provided by callers. Voice/speech recognition utilizes speech enabled telephony. In "speech enabled" telephony systems callers may talk, not dial. For example, according to a voice activated dialing system, a caller may speak the words "Call Joe." According to embodiments of the present invention described below, the VSN 56 places a call to the desired called party. Speech enabled telephony makes use of speech recognition and text-to-speech conversion in order to talk to callers. VSNs 56 may find phone numbers, dial them, read a caller her voice and email messages, allow the caller to respond and then send a caller a message over the Internet or over her corporate intranet. Speech enabled telephony allows a subscriber to call the VSN 56 to obtain (hear) information specific for the subscriber.

Voice recognition via the VSN 56 also includes the ability of a machine to recognize a subscriber's voice. Voice recognition includes the ability of a machine to understand human speech particular to a subscriber. Isolated word and phrase recognition is used in which a VSN 56 is trained to recognize a discrete set of command words or phrases and to respond appropriately. Connected word recognition is used in which a VSN 56 is trained on a discrete set of vocabulary words (for example, digits), but is required to recognize fluent sequences of these words such as credit card numbers. Continuous speech recognition is used in which a VSN 56 is trained on a discrete set of subword vocabulary units (e.g., phonemes), but is required to recognize fluent speech.

A speech recognition system usually is made up of an input device, a voice board that provides analog-to-digital conversion of the speech signal, and a signal processing module that takes digitized speech samples and converts them into a series of patterns. These patterns are then compared to a set of stored models that have been constructed from the knowledge of acoustics, language, and dictionaries. The technology may be speaker dependent (trained), speaker adaptive (improves with use), or fully speaker independent. In addition features such as barge-in capability, which allows the user to speak at anytime, and key word spotting, which makes it possible to pick out key words from among a sentence of extraneous words, enable the development of more advanced applications.

According to embodiments of the present invention, the VSN 56 also includes general computing functionality including a computer processor and associated memory for running one or more software applications or software modules described herein and for storing associated data. According to embodiments of the present invention, the VSN 56 is operative to send database queries to the customer profile database 70 and to the address book database 75 via well known data transmission protocols, including TCP/IP. The VSN 56 may receive and process return data from those databases. Additionally, as with the SN 55, the VSN 56 may route calls within the telecommunications network in which the VSN 56 resides, as well as, send and receive calls. The VSN 56 is further operative to send and receive data through a distributed computing network, such as the Internet 50, to a variety of remote data storage mediums and local and remote information resource providers such as may be available at the server 66.

The customer profile data base 70 is a general purpose database. As known to those skilled in the art, a database may be composed of records, each containing fields together with a set of operations for searching, sorting, recombining, and other functions. The customer profile database may include a variety of information for each subscriber such as a subscriber's telephone directory numbers, including business, wireless and personal numbers. The customer profile database 70 may include the subscriber's electronic mail address and a list of services subscribed to by the subscriber such as call forwarding, call waiting and voice mail, etc. The customer profile database may include other personal information such as directions to always forward calls to the subscriber at a specific number on certain days or times. Marketing and advertising information may also be included in a customer profile to be provided to callers to the subscriber.

The address book database 75 is another database that contains information on parties saved at the direction of or for the benefit of a subscriber. For example, in accordance with the present invention, a directory number obtained from directory assistance by a subscriber may then be saved in the subscriber's address book so that the subscriber does not need to use directory assistance the next time the subscriber needs that number. Other information such as a party's physical address, electronic mail address and other helpful information on the party may be saved in the address book database 75.

The directory assistance service 80 is illustrative of any local directory assistance service (provided by the subscriber's telecommunications service provider or third party or of a third party directory assistance service that may be accessed from a number telecommunications networks for obtaining a directory number for a desired called party. Some directory assistance services provide addresses for desired called parties upon request. Directory assistance services are well known to those skilled in the art.

The voice mail system 65 is shown in FIG. 1 being functionally connected to the switch 14 and is a component of the network 100. That is, calls are routed to and from the voice mail system 65 at the control and direction of the network 100 via such components as the SCP 42. The voice mail system 65 typically includes a computer or collection of computers, recording and recording playback devices, and software for recording announcements for incoming calls, recording and playing back recorded messages, and for receiving incoming calls and for making outgoing calls at the direction of the network 100. The voice mail system 65 has memory capacity for saving announcements to incoming callers and for saving messages from incoming callers. The computing system of the voicemail system 65 may send and receive electronic mail via the network 100 and the Internet 70.

A computer telephony interface 83 serves as an interface between the telephone 21 and the computer 23. Computer telephone integration, as facilitated by the computer telephony interface (CTI) 83, is a process for integration of a telephone system with a computing system. For example, the CTI 83 may be used for allowing computer applications to answer incoming calls, provide database information on a computer screen at the same time the call comes in, automatically route and reroute calls, automatically dial and speed dial outgoing calls from a computer resident database and identify incoming customer calls and transfer them to predetermined destinations based on calling party identification received on the incoming telephone call. The computer telephony interface 83 may be a software application program resident on the telephone 21.

The Internet 50 is well known to those skilled in the art as essentially a packet-switched network based on the family of protocols called Transmission Control Protocol/Internet Protocol (TCP/IP), a family of networking protocols providing communication across interconnected networks between computers with diverse hardware architectures and between various computer operating systems. Operation of the Internet 50 and the TCP/IP transmission protocols is well known to those skilled in the art.

The server 66 is a computer or collection of computers and associated memory storage. On the Internet 50 or other network, the server 66 may include a computer or software application that responds to commands from a client computer, for example the VSN 56 according to the present invention. A file server may contain an archive of data or program files. When a client computer submits a request for a file to the file server, the file server transfers a copy of the file to the client computer.

In operation, the intelligent network elements of the AIN, as described above, communicate with each other via digital data messages transmitted over the network of digital data links. An SSP may be configured to interface with these network elements through the use of a trigger. A trigger in the network is an event associated with a particular subscriber line or call that causes the SSP to generate a data packet message to be sent to a service control point. In order to keep the processing of data and calls as simple and generic as possible at central office switches, such as SSP switches 12 and 14, a relatively small set of triggers are defined at the SSP switches for each call.

The message created by an SSP in response to the "firing" of a trigger is known as a "query" message. A query message opens a "transaction" and the SSP generally holds the communication until it receives a reply from an appropriate network element via the network of digital data links instructing the SSP 12 to take a certain action. If the SSP 12 receives no instructions within a certain amount of time, the SSP "times-out" and executes a default task for the communication. The reply to the query message may be a "conversation" message or a "response" message. Conversation messages allow for bi-directional exchanges between network elements while the transaction remains open. A "response" message closes the transaction opened by the query message, and usually instructs the SSP to route the held communication for connection with a terminating station. Query messages, conversation messages, and response messages are standard types of messages defined by the AIN protocol. The details of the AIN protocol are well known to those skilled in the art and will not be further described herein. For more information regarding the AIN protocol, see Bellcore Specification GR-1298-CORE Switching Systems Generic Requirements for AIN 0.1, which is incorporated-herein by reference.

The wireless network 51, such as a cellular network, comprises a mobile switching center (MSC) 52, 57. The MSC 52 is a switch providing services and coordination between wireless users in the network 51 and external networks. The MSC 52 may be connected to the STP 34 to provide information to the wireline network and receive information from the wireline network. The MSC 52 also communicates with a wireless subscriber, such as wireless telephones 53.

Operation

Figure 3:
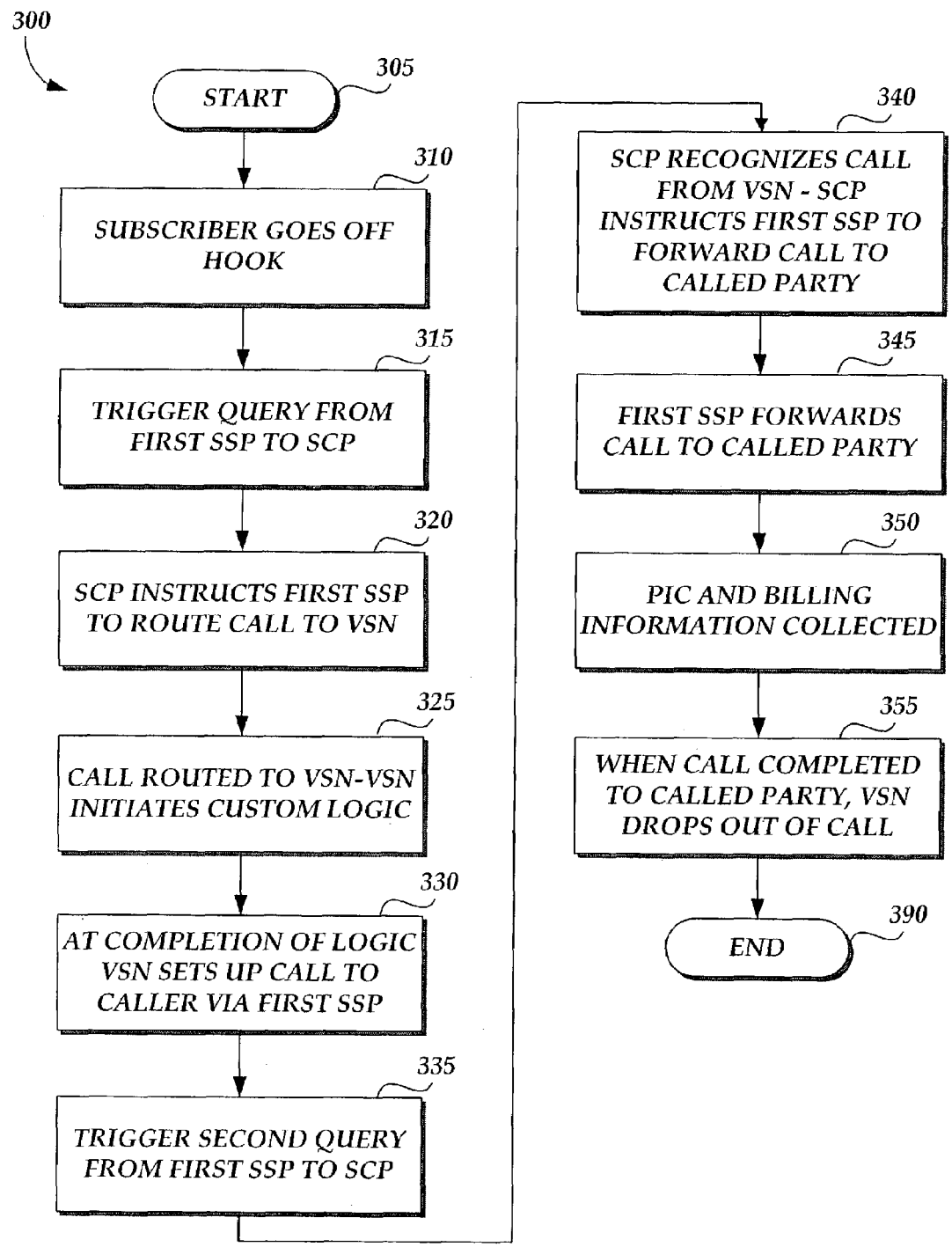
FIG. 3 illustrates a logical call flow of steps performed by a method and system of the present invention for utilization of a voice services node in general call processing.

FIG. 3 illustrates a logical call flow of steps performed by a method and system of the present invention for utilization of a voice services node 56 in general call processing. According to embodiments of the present invention, the voice services node 56 is utilized to facilitate voice interaction between a subscriber and components of the subscriber's telecommunications network and for providing other processing including database lookup and general call processing. For purposes of description, and by way of example only, FIG. 3 is described with reference to call processing steps associated with a voice activated dialing system where a subscriber may connect to a voice services node 56, speak the name of a desired called party and receive assistance from the voice services node 56 in locating a directory number associated with the desired called party and for processing a call between the subscriber and the called party. As should be understood by those skilled in the art, a number of other services may be provided by interaction between a subscriber and the voice services node 56, as described herein with reference to embodiments of the present invention.

Referring then to FIG. 3, the method 300 begins at start step 305 and proceeds to step 310 where a subscriber initiates contact with a voice services node 56 to obtain the services of the voice services node 56 in assisting the subscriber with some type of call processing, for example voice activated dialing, or some other telecommunications service available to the subscriber, for example directory assistance services. At step 310, the subscriber may initiate contact with the voice services node in a variety of manners. According to one embodiment, an off-hook delay trigger may be provisioned at the subscriber's SSP 12 so that when the subscriber takes her telephone set 21 into an off-hook configuration, the off-hook delay trigger provisioned at the SSP 12 triggers (fires) a query for initiating an interactive session with the voice services node 56. Alternatively, at step 310, the subscriber may dial using her telephone 21 a specialized dialing code associated with the desired service. For example, if voice activated dialing is desired by the subscriber, the subscriber may dial a service code, for example "*11," that will be received by the subscriber's SSP 12 which will in turn cause a query to be triggered (fired) from the SSP 12 to initiate an interactive voice session with the voice services node 56.

At step 315, a trigger provisioned at the subscriber's SSP 12 is fired causing a query to the service control point 42 for routing and processing instructions associated with the call. At step 320, the service control point 42 recognizes the query as being associated with the requested service, for example voice activated dialing service, and the service control point 42 instructs the subscriber's SSP 12 to route the call from the subscriber to the voice services node 56. At step 325, the call is received by the voice services node 56, and the voice services node 56 initiates custom logic associated with the requested service. For example, if the requested service is voice activated dialing, the voice services node 56 may provide an audio prompt to the caller such as "Who would you like to call?" Following with the present example, the subscriber (calling party) may respond with a name such as "John Doe," and the voice services node 56 converts the responsive name provided by the subscriber to a digital file using a speech recognition software module resident at the voice services node 56.

The name provided by the subscriber, "John Doe," is used by the voice services node 56 to parse an address book 75 associated with the subscriber or calling party to determine whether a directory number has been stored for the requested name. The voice services node 56 may utilize a calling line identification number associated with the telephone line from which the subscriber has called for matching the subscriber to the subscriber's personal address book 75. Alternatively, the subscriber may be required by the voice services node 56 to enter or speak a user ID and personal identification number.

If the voice services node 56 obtains a directory number associated with the requested name, call processing continues to step 330. Once processing by the voice services node according to the calling feature, for example voice activated dialing, is completed by the voice services node 56, the method continues to step 330, and the voice services node sets up a call to the subscriber via the subscriber's SSP switch 12. According to the example described herein, the voice services node 56 sets up a call ultimately between the subscriber (calling party) and the desired called party via the directory number obtained for the desired called party name.

At step 335, a trigger provisioned at the caller's switch 12 is fired by the call from the voice services node 56 back to the subscriber at the subscriber's switch 12. According to one embodiment of the present invention, the trigger provisioned at the switch 12 is a termination attempt (TAT) trigger. At step 335, the trigger fired at the SSP 12 by the call from the voice services node 56 launches a second query to the service control point 42. At step 340, the service control point 42 recognizes the call from the voice services node 56, and the service control point 42 instructs the SSP 12 to forward the call from the voice services node 56 to the called party using the directory number obtained for the called party by the voice services node 56. At step 345, the SSP 12 forwards the call from the voice services node 56 to the called party at the called party's telephone 24 through the called party's switch 14 via the public switched telephone network 31. As should be understood by those skilled in the art, at this point, a three-way communication is established between the subscriber, the voice services node 56 and the called party. At step 350, billing information, associated with the call may be collected. At step 355, when the call is completed between the subscriber and the called party, the voice services node 56 drops itself from the call leaving the subscriber in communication with the called party.

Accordingly, the voice services node 56 facilitates a voice activated dialing session where the subscriber is required to only speak the name of the party to whom she would like to be connected, and the voice services node 56 facilitates the connection by setting up a call between the subscriber and the desired called party followed by the voice services node 56 dropping itself from the call. The method ends at step 390. As should be understood, the foregoing description of FIG. 3 is described with reference to a voice activated dialing service by way of example only to illustrate the interaction between a subscriber and the voice services node 56 and to illustrate some of the capabilities of the voice services node 56 for causing call routing and to facilitate specialized services required by the subscriber.

Additional specialized features and call processing functionality provided via interaction between a subscriber and a voice services node 56 is described below with reference to FIG. 4. For further description of methods and systems for accessing and obtaining functionality from a voice services nodes 56, see U.S. patent application Ser. No. 10/029,549, filed Dec. 21, 2001, entitled "Method and System of Call Orientation Using a Service Circuit Node in an Advanced Intelligent Network" and U.S. patent application Ser. No. 10/033,627, filed Dec. 27, 2001, entitled "Method and System of Voice Activated Dialing Using an Intelligent Peripheral in Advanced Intelligent Network" both applications of which are incorporated herein by reference as if fully set out herein. Additionally, routing of calls from a subscriber or calling party to and from a voice services node 56, as described above with reference to FIG. 3 may be performed according to standard advanced intelligent network procedures and protocols which are well known to those skilled in the art.

Figure 4:
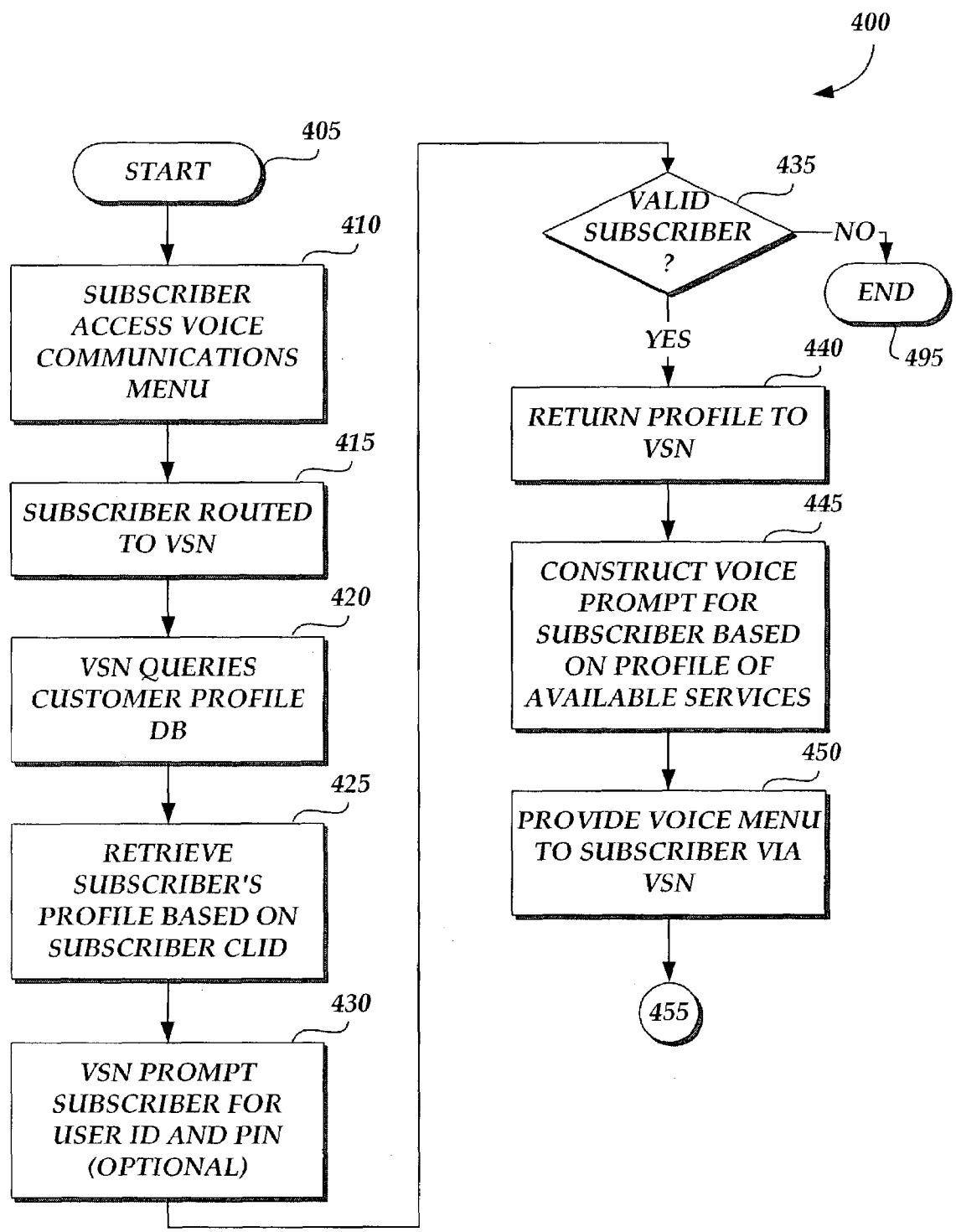
FIGS. 4 and 5 illustrate a logical call flow of the steps performed by a method and system of the present invention for providing a telecommunications services menu accessible by a subscriber via a voice services node.
Figure 5:
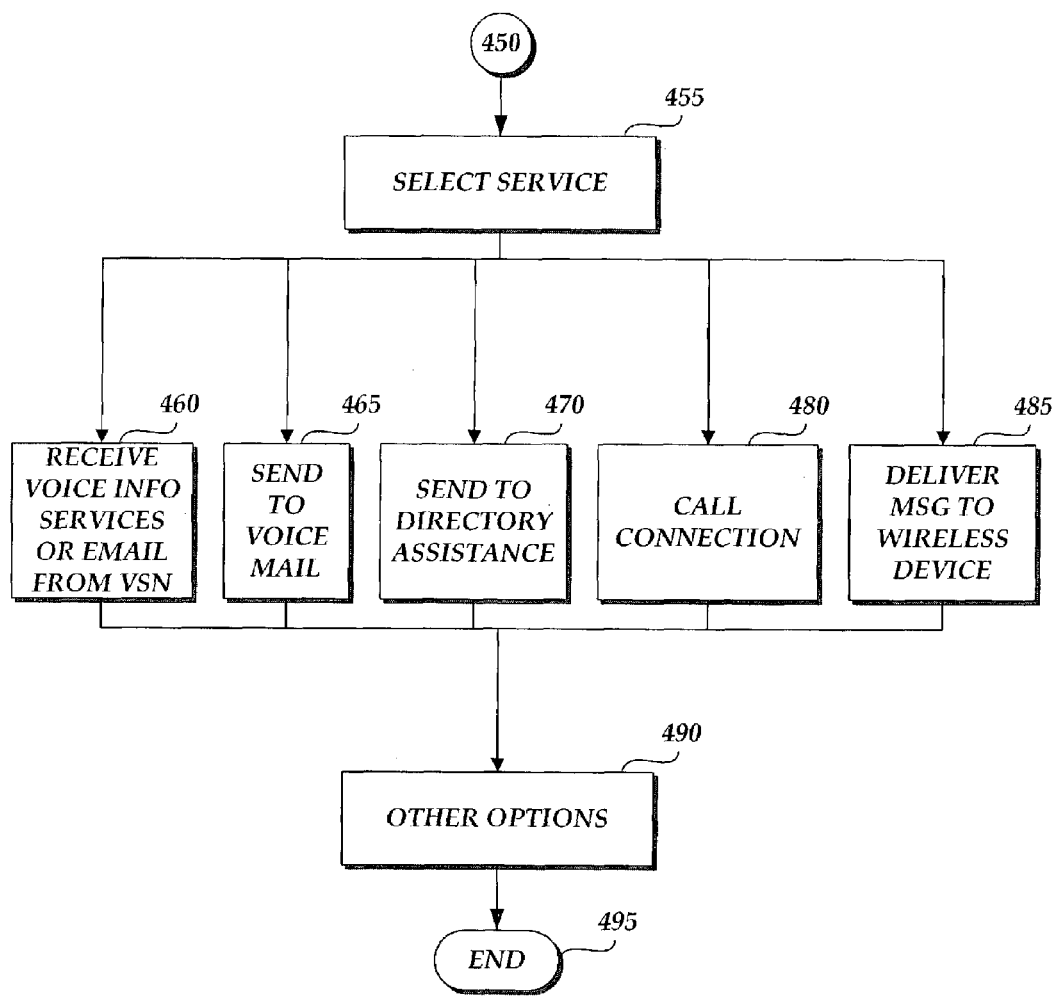

FIGS. 4 and 5 illustrate a logical call flow of the steps performed by methods and systems of the present invention for providing a telecommunications services menu accessible by a subscriber via a voice interactive communications session between the subscriber and a telecommunications network. According to embodiments of the present invention, a subscriber may obtain a menu of all telecommunications-based services available to the subscriber via a single voice interactive session between the subscriber and her telecommunications services provider. Once the subscriber has received the voice menu of available services, the subscriber may select from the menu of available services to activate or receive the selected service.

The method 400 begins at start step 405 and proceeds to step 410 where the subscriber accesses the voice communications menu via the voice services node 56. Access to the voice services node 56 is accomplished as described with reference to FIG. 3. For example, a specialized trigger such as an off-hook delay trigger may be provisioned at the subscriber's switch 12 for connecting the subscriber to the voice services node 56 in order to receive the voice communications menu. Alternatively, the subscriber may be provided with a single voice communications menu dialing code such as "*12" that may be entered by the subscriber at her telephone 21 via the public switched telephone network 31 or via her wireless telephone 53 via the wireless network 51.

At step 415, the subscriber's call is routed to the voice services node 56, as described above with reference to FIG. 3. At step 420, the voice services node 56 recognizes that the call from the subscriber requires the presentation of a voice communications menu to the subscriber. The voice services node 56 prepares and submits a database query to the customer profile database 70 to obtain information as to the services available to the subscriber. As should be understood by those skilled in the art, the subscriber may have subscribed to a variety of telecommunications services, for example voice mail services, outbound information notification services, delivery of messages to wireless devices services, directory assistance services, and a variety of call processing services such as call forwarding, caller identification, simultaneous ring service, and the like. The list of available services that may be provided to the subscriber in the voice communications menu is limited only by the available telecommunications services offered by the subscriber's telecommunications services provider and subscribed to by the subscriber. That is, the voice communications menu received by the subscriber via the voice services node 56 will list all services subscribed to by the subscriber and will allow the subscriber to select use of those services from the menu.

According to an embodiment of the present invention, a customer profile is maintained for each subscriber at the customer profile database 70 populated with a listing of all services available to the subscriber. The subscriber may access the customer profile database 70 via the voice services node 56 from the subscriber's wireline telephone 21, computer 23, wireless telephone 53, wireless personal digital assistant 58 or via the Internet 50 to update information or review information contained in the subscriber's customer profile for populating the voice communications menu.

At step 425, in response to the database query from the voice services node 56 to the customer profile database 70, the subscriber's profile is retrieved by the voice services node 56 based on the calling line identification associated with the line from which the subscriber's call is placed. Alternatively, at step 430, the voice services node 56 may prompt the subscriber to provide a user identification and/or personal identification number. At step 435, a determination is made as to whether the subscriber seeking access to the voice communications menu is a valid subscriber based on the calling line identification number or user identification number and/or personal identification number. If the subscriber has not subscribed to the voice communications menu services, the method may end at step 495 where the user may be provided a prompt by the voice services node 56 such as "You do not have access to voice communications menu services." Alternatively, the voice services node 56 may provide a prompt to the subscriber to allow the subscriber to register with her telecommunications service provider for voice communications menu services according to the present invention. For example, a prompt may be provided to the subscriber such as "If you would like to register for voice communications menu services for future use, press 1."

If the subscriber is validated at step 435, the method proceeds to step 440, and the customer profile associated with the subscriber is returned to the voice services node 56. The customer profile returned to the voice services node 56 contains data associated with each telecommunications service available to the subscriber. At step 445, the voice services node 56 constructs a voice prompt for the subscriber based on the profile of available services. The profile constructed by the voice services node 56 is converted from text-to-speech by a text-to-speech software module resident at the voice services node 56 for presentation to the subscriber. At step 450, the text-to-speech voice menu is provided to the subscriber via the voice services node 56 utilizing call routing methods and procedures as described above with reference to FIG. 3.

The text-to-speech menu or digital audio file menu constructed by the voice services node 56 is played to the subscriber in a voice interactive session to which the subscriber may respond to select services listed on the voice communications menu. For example, a prompt may be provided to the subscriber such as "Welcome to the voice communications menu, to select voice mail services, press 1, to select electronic mail reader services, press 2, to select directory assistance services, press 3, to select outbound notification services to update or change your outbound notification services, press 4 . . . "

At step 455, if the user selects a service listed on the voice communications menu of services, the selection is passed to the voice services node 56, and the voice services node 56 causes the subscriber's call to be routed according to the selected service. For example, if the subscriber wishes to be directed to her voice mail box to review voice messages left to the subscriber, the method proceeds to step 465. At step 465, if the subscriber selects voice mail services from the voice communications menu, the voice services node 56 routes the subscriber's call to the voice mail system 65 in the same manner as the voice services node routed the subscriber's call to the called party, as described above with reference to FIG. 3. According to one embodiment of the present invention, after the subscriber is connected to a particular service, such as the voice system 65, the voice services node 56 may drop out of the call, as described above with reference to FIG. 3. Alternatively, the voice services node 56 may stay on the call, for example between the subscriber and the voice mail system 65, in order to provide additional services or to provide a return of the subscriber to the voice communications menu after the subscriber has completed utilization of the voice mail system 65.

For another example, if the subscriber selects to update or review voice information services provided to the subscriber through an outbound notification system, the method may proceed to step 460, and the voice services node 56 may query the customer profile database 70 to provide the subscriber with a list of information services, for example traffic, weather, news, and financial information services that may be transmitted to the subscriber at the subscriber's designated telephone directory number on a periodic basis as designated by the subscriber. For a detailed description of the use of outbound information notification services, see U.S. patent application Ser. No. 10/393130, filed Mar. 20, 2003, entitled "Outbound Notification Using Customer Profile Information," assigned to the same assignee as the present invention, and incorporated herein by reference as if fully set out herein.

Accordingly, the voice services node 56 serves as a voice interactive conduit between the subscriber and telecommunications services available to the subscriber so that the subscriber does not have to dial a different entry code associated with each available service. For example, if the subscriber wishes to receive voice activated dialing or voice interactive directory assistance services, the method may proceed to step 470, and the voice services node 56 will route the subscriber's call for receipt of voice activated dialing or voice interactive directory assistance services, as described above with reference to FIG. 3. Thus, the subscriber is only required to know and utilize a single entry code or entry access method to obtain the voice communications menu with which the user may review all available telecommunications services and from which the subscriber may select one or more telecommunications services for use. After the user has reviewed available services from the voice communications menu and/or selected any desired service, the method proceeds to step 490, where the voice services node 56 may prompt the user with other available options including updating the list of services available to the user. The method ends at step 495.

As described herein, methods and systems are described for providing a telecommunications services menu accessible via a voice interactive session between a subscriber and her telecommunications services provider. It will be apparent to those skilled in the art that various modifications and variations may be made in the present invention without departing from the scope or spirit of the invention. Other embodiments of the invention will be apparent to those skilled in the art from consideration of the specification and practice of the invention disclosed herein.

We claim:

1. A method of providing a telecommunications services menu accessible via a voice interactive system, comprising:

placing a call at a subscriber switch for voice interactive services;

routing the call to a network component for voice interactive services;

receiving a request at the network component for a voice menu of available telecommunications services;

at the network component, querying a subscriber customer profile for a list of telecommunications services available to a subscriber based on telecommunications services subscribed to by the subscriber wherein querying the subscriber customer profile includes passing a calling line identification associated with a calling line from which the subscriber is calling to a customer profile database wherein the subscriber customer profile is located without subscriber input based on the calling line identification;

returning the list of telecommunications services available to the subscriber from the customer profile to the network component wherein the customer profile is matched to the subscriber based on the calling line identification;

at the network component, constructing a voice prompt for providing the list of telecommunications services available to the subscriber; and providing the list of telecommunications services available to the subscriber;

wherein the list telecommunications of services available to the subscriber varies solely based on the telecommunications services subscribed to by the subscriber.

2. The method of claim 1, wherein querying the subscriber customer profile for the list of telecommunications services available to the subscriber includes querying the subscriber customer profile via a database query to the customer profile database.

3. The method of claim 2, wherein querying the subscriber customer profile via the customer profile database includes passing a user identification via a database query to the customer profile database.

4. The method of claim 2, wherein querying the subscriber customer profile via the customer profile database includes passing a subscriber personal identification number via a database query to the customer profile database.

5. The method of claim 1, after querying the subscriber customer profile for the list of telecommunications services available to the subscriber, parsing the subscriber customer profile for the list of telecommunications services available to the subscriber.

6. The method of claim 5, wherein returning the list of telecommunications services to the subscriber from the customer profile to the network component includes returning the list of telecommunications services available to the subscriber in response to the database query from the network component to the customer profile database.

7. The method of claim 1, prior to querying the subscriber customer profile for the list of telecommunications services available to the subscriber, validating the subscriber for access to the list of telecommunications services available to the subscriber.

8. The method of claim 1, wherein constructing the voice prompt for providing the list of telecommunications services available to the subscriber includes converting the list of telecommunications services available to the subscriber from text-to-speech for playing to the subscriber as an audio-formatted message.

9. The method of claim 8, further comprising providing the list of telecommunications services available to the subscriber telephonically from the network component to the subscriber via the subscriber's switch.

10. The method of claim 1, after providing the list of telecommunications services available to the subscriber:
   receiving a subscriber selection of one or more available services from the list of telecommunications services available to the subscriber; and
   providing the selected telecommunications service to the subscriber.

11. The method of claim 10, wherein providing the selected telecommunications service to the subscriber includes routing the subscribers call to a directory assistance service to allow the subscriber to receive directory assistance services.

12. The method of claim 10, wherein providing the selected telecommunications service to the subscriber includes routing the subscribers calls to a called party designated by the subscriber.

13. The method of claim 12, wherein routing the subscriber's call to a called party includes providing a called party directory number to the network component from subscriber.

14. The method of claim 10, wherein providing the selected telecommunications service to the subscriber includes routing the subscriber's call to another network component for provision of the selected telecommunications service.

15. The method of claim 14, wherein routing the subscriber's call to another network component for provision of the selected telecommunications service includes routing the subscriber's call to a voice mail service system to allow the subscriber to review voice mail messages to the subscriber.

16. The method of claim 10, wherein providing the selected telecommunications service to the subscriber includes providing an electronic mail reader service via a Voice over Internet Protocol connection through the network component to the subscriber.

17. The method of claim 10, wherein providing the selected telecommunications service to the subscriber includes providing message delivery from the subscriber to a wireless message receiving device.

18. The method of claim 10, wherein providing the selected telecommunications service to the subscriber includes providing subscriber designated information services to the subscriber via the network component.

19. The method of claim 1, after\querying the subscriber customer profile for the list of telecommunications services available to the subscriber, prompting the subscriber from the network component to establish a customer profile if no customer profile is located for the subscriber in the customer profile database.

20. The method of claim 1, prior to placing the call at the subscriber switch for voice interactive services, accessing the subscriber's customer profile in the customer profile database to update the list of telecommunications services available to the subscriber.

21. The method of claim 20, after accessing the subscriber's customer profile in the customer profile database to update the list of telecommunications services available to the subscriber, populating the subscriber's customer profile with a list of updated telecommunications services available to the subscriber.

22. The method of claim 21, wherein accessing the subscribers customer profile in the customer profile database to update the list of telecommunications services available to the subscriber includes accessing the subscriber's customer profile telephonically via the network component.

23. The method of claim 21, wherein accessing the subscriber's customer profile in the customer profile database to update the list of telecommunications services available to the subscriber includes accessing the subscriber's customer profile via a distributed computing environment.

24. The method of claim 23, wherein accessing the subscriber's customer profile via a distributed computing environment includes accessing the subscriber's customer profile via the Internet.

25. The method of claim 24, wherein accessing the subscribers customer profile via the Internet includes accessing the subscriber's customer profile via a TCP/IP protocol connection from a subscriber's computing device to the customer profile database.

26. The method of claim 1, wherein providing the list of telecommunications services available comprises providing a menu of all telecommunications-based services available to the subscriber via a single voice interactive session between the subscriber and a telecommunications services provider of the subscriber.

27. The method of claim 1, further comprising parsing a personal address book associated with the subscriber wherein parsing the personal address book includes utilizing a calling line identification associated with a calling line from which the subscriber is calling to match the subscriber to the personal address book associated with the subscriber wherein the personal address book associated with the subscriber is located without subscriber input based on the calling line identification.

28. A method of providing a telecommunications services menu accessible via a voice interactive system, comprising:
   receiving a request at a telecommunications system voice services node from a subscriber for a voice menu of available telecommunications services;
   at the voice services node, querying a subscriber customer profile database for a list of telecommunications services available to the subscriber based on telecommunications services subscribed to by the subscriber wherein querying the subscriber customer profile database includes passing a calling line identification associated with a calling line from which the subscriber is requesting to the customer profile database wherein the subscriber customer profile is located without subscriber input based on the calling line identification;
   receiving the list of telecommunications services available to the subscriber from the customer profile wherein the customer profile is matched to the subscriber based on the calling line identification;
   at the voice services node, creating a voice menu of available telecommunications services from the list of telecommunications services available to the subscriber;
   providing the voice menu of available telecommunications services to the subscriber;
   receiving a subscriber selection of one or more available services from the menu of available telecommunications services; and
   providing the selected service to the subscriber;
   wherein telecommunications services available vary solely based on the telecommunications services subscribed to by the subscriber.

29. A system for providing a telecommunications services menu accessible via a voice interactive system, comprising:
   a telecommunications system voice services node operative to:
   receive a request for a voice menu of available telecommunications services from a subscriber;
   query a subscriber customer profile database for a list of telecommunications services available to the subscriber wherein querying the subscriber customer profile database includes passing a calling line identification associated with a calling line from which the subscriber is requesting to the customer profile database wherein the subscriber customer profile is located without subscriber input based on the calling line identification;

receive the list of telecommunications services available to the subscriber from the customer profile wherein the customer profile is matched to the subscriber based on the calling line identification;

to create a voice menu of available telecommunications services from the list of telecommunications services available to the subscriber; and to provide the voice menu of available telecommunications services to the subscriber;

wherein the list of telecommunications services available to the subscriber varies solely based on the telecommunications services subscribed to by the subscriber.

30. The system of claim 29, wherein the voice services node is further operative to:

receive a subscriber selection of one or more available services from the menu of available telecommunications services; and provide the selected service to the subscriber.

31. The system of claim 29, wherein the voice services node operative to query is operative to prepare and submit a database query to the customer profile database to obtain information as to the telecommunications services available to the subscriber.

* * * * *